United States Patent [19]
Beven

[11] Patent Number: 6,167,036
[45] Date of Patent: Dec. 26, 2000

[54] METHOD AND APPARATUS FOR A SECTORED CELL OF A CELLULAR RADIO COMMUNICATIONS SYSTEM

[75] Inventor: David Damian Nicholas Beven, Bishops Stortford, United Kingdom

[73] Assignee: Nortel Networks Limited, Montreal, Canada

[21] Appl. No.: 09/198,387

[22] Filed: Nov. 24, 1998

[51] Int. Cl.[7] .................................................. H04L 27/30
[52] U.S. Cl. ............................ 370/331; 455/440; 455/442
[58] Field of Search ..................................... 370/331, 335, 370/342; 455/442, 435, 440

[56] References Cited

U.S. PATENT DOCUMENTS

| | | | |
|---|---|---|---|
| 4,144,411 | 3/1979 | Frenkiel | 370/342 |
| 4,144,496 | 3/1979 | Cunningham et al. | 370/342 |
| 5,228,029 | 7/1993 | Kotzin | 370/335 |
| 5,379,447 | 1/1995 | Bonta et al. | 455/33.2 |
| 5,432,780 | 7/1995 | Smith et al. | 455/33.1 |
| 5,432,843 | 7/1995 | Bonta | 455/33.2 |
| 5,448,753 | 9/1995 | Ahl et al. | 455/33.1 |
| 5,535,423 | 7/1996 | Dupuy | 455/33.1 |
| 5,576,717 | 11/1996 | Searle | 342/373 |
| 5,594,718 | 1/1997 | Weaver, Jr. et al. | 370/331 |
| 5,861,844 | 1/1999 | Gilmore et al. | 455/423 |
| 5,883,888 | 3/1999 | St-Pierre | 370/331 |
| 5,999,522 | 5/2000 | Rohani | 370/331 |
| 6,049,716 | 5/2000 | Jung | 455/442 |
| 6,061,337 | 5/2000 | Light et al. | 370/331 |

FOREIGN PATENT DOCUMENTS

| | | |
|---|---|---|
| WO 96/09733 | 3/1996 | WIPO . |
| WO 96/17487 | 6/1996 | WIPO . |

*Primary Examiner*—Melvin Marcelo
*Assistant Examiner*—Phuongchau Ba Nguyen
*Attorney, Agent, or Firm*—Lee, Mann, Smith, McWilliams, Sweeney & Ohlson

[57] ABSTRACT

A nine-sectored cell (20) of a cellular radio communications system has three base transceiver stations (BTSs) colocated at its cell site (26). Each BTS is substantially independently coupled to a remote base station controller (BSC). Each BTS handles communications with subscriber units within a respective coverage area including three mutually-adjacent sectors (e.g. a1, b1, c1). When a subscriber unit moves between the coverage areas of different BTSs, a soft handoff is controlled by the BSC. When a subscriber unit moves between two sectors in the same coverage area, a softer handoff is implemented by the respective BTS.

15 Claims, 5 Drawing Sheets

— Centre beam (46)
-- Side beam (44)
— Side beam (48)
— Element pattern

METHOD AND APPARATUS FOR A SECTORED CELL OF A CELLULAR RADIO COMMUNICATIONS SYSTEM

TECHNICAL FIELD

This invention relates to a method and apparatus for a sectored cell of a cellular radio communications system.

BACKGROUND OF THE INVENTION

Cellular radio communications systems are widely used throughout the world to provide telecommunications to mobile users. A geographic area covered by a cellular radio system is divided into cells, each containing a cell site, through which subscriber units communicate. The geographic area is divided into cells for a number of reasons, including the following. First, bandwidth can be reused in different cells in order to meet the users' demand for communications capacity within an available frequency band allocation. Second, the use of cells limits the maximum transmission range required of a subscriber unit, thus limiting the power consumption of the subscriber unit. Third, the use of cells limits the number of subscriber units to be served by each cell site, which helps to maintain a satisfactory signal-to-interference ratio in each cell throughout the system.

In general, an object of cellular radio communications system design is to reduce the number of cell sites required by increasing their range and/or capacity. This is because cell sites are expensive, both because of the equipment required and because of the need for a geographical site for each cell site. Geographical sites may be costly and may require extensive effort to obtain planning permission. In some areas, suitable geographical sites may even not be available.

The communications ranges in many systems are uplink (mobile to cell site) limited because of the limited power available at the subscriber unit, which may be a hand-portable subscriber unit. However, any increase in range would mean that fewer cells would be required to cover a given geographical area, thus advantageously reducing the number of cell sites and associated infrastructure costs.

When a cellular radio system is set up in an area of high demand, such as a city, then cell site communications capacity, rather than range, usually limits cell size. An increased cell site capacity would therefore reduce the required number of cell sites and so reduce costs.

One approach to increasing range and/or capacity is to use directional antennas at a cell site physically to separate radiations at similar frequencies. This is known as sectorisation. It has been proposed to use three-sectored cells, having three antennas with nominally 120° azimuthal beamwidth, or hex-sectored cells, having six antennas with nominally 60° azimuthal beamwidth (as described for example in U.S. Pat. No. 5,576,717). In each case, one effect of the sectorisation is to reduce interference from mobiles and cell sites in adjacent and nearby cells, and thus to increase the total range and/or capacity of the cell site in a sectored cell relative to a cell using an omni-directional antenna.

However, there are problems which arise from the sectoring approach, particularly as the number of sectors increases. In any cellular system, a subscriber unit may move from one cell to another, necessitating transfer of the communication link from one cell site to another by a process known as handoff. In a sectored cell, a subscriber unit may also move from one sector to another, necessitating additional handoffs between the sectors of a cell site. Clearly, as the number of sectors increases, so does the number of handoffs, making increasing demands on the processing and communications capacity of the system.

One mode of communication used in cellular radio systems in which sectorisation may be particularly advantageous is spread spectrum communication, such as code division multiple access (CDMA). In such systems, all cell site transmissions, both in different sectors and in different cells, may be in the same frequency band.

SUMMARY OF THE INVENTION

An object of the invention is to provide a cell site, cell site equipment and a method of operating these which permits a sectored cell to be implemented with good performance at acceptable cost.

A further object of the invention is to enable a cell site, or cell site equipment, to be implemented or upgraded advantageously using as far as possible conventional hardware with only a small amount of modification.

The invention provides in its various aspects a cell site, cell site equipment and methods of operating a cell site and cell site equipment as defined in the appended claims, to which reference should now be made. Preferred or advantageous features of the invention are defined in dependent subclaims.

The invention in a first aspect may thus advantageously provide a cell site at which the cell site equipment comprises more than one base transceiver station (BTS), each BTS covering one or more sectors of the cell. Preferably, the BTSs colocated at a cell site are substantially independent of each other, each being coupled individually to a base station controller (BSC), which may be remote from the cell site.

Particularly preferably, at least one of the colocated BTSs covers two or more sectors. In that case, handoffs as subscriber units move between sectors covered by the same BTS are preferably handled substantially independently by that BTS. These handoffs are termed softer handoffs and contrast with soft handoffs which occur when a subscriber unit moves between sectors of the cell covered by different BTSs. Soft handoffs are preferably handled by the BSC controlling the two (or more) BTSs involved.

Advantageously, the invention may thus provide a cell site offering performance benefits over conventional cell sites in terms of coverage area and/or capacity. Particularly advantageously, the invention may provide a means for upgrading an existing cell site to increase its coverage and/or its capacity, for example if the existing cell site has become fully loaded. This may occur if, after a cellular radio system has been set up, demand increases to exceed the capacity of existing cell sites. A method of upgrading existing cell sites to increase capacity where required might then advantageously reduce costs because the capacity of the system could be increased without acquiring any new geographical sites for cell sites or installing a greater number of cell sites.

In this latter aspect of the invention an existing cell site having one BTS may be upgraded by the addition of one or more further BTSs. The sector coverage of the BTSs may have to be altered to achieve this, which may require additional or new antennas. However, advantageously the existing BTS may be retained because the BTSs at the cell site of the invention may in a preferred embodiment of the invention not need to be interconnected; each may only be coupled independently to a BSC.

The invention in various aspects relates to sectorisation of cells or to increasing the sectorisation of cells. As such, performance gains may be achieved in terms of coverage and capacity due to reduction in interference due to the spatial filtering effects of narrower antenna patterns, accompanied by the increased gain that such narrower patterns achieve. Higher levels of sectorisation lead to problems, however, such as the need for wide-aperture antennas to generate narrow beamwidth (narrow sector) antenna radiation patterns, and the need to handle an increased frequency of handoffs. Advantageously, the invention may achieve these requirements for levels of sectorisation up to a six- or nine- sectored cells, or more.

In a further aspect of the invention the cell site equipment may include one or more antennas suitable for implementing the invention.

In a further aspect of the invention, a preferred embodiment is a nine-sectored cell of a cellular radio communications system having three BTSs colocated at its cell site. Each BTS is substantially independently coupled to a remote BSC. Each BTS handles communications with subscriber units within a respective coverage area including three mutually-adjacent sectors. When a subscriber unit moves between the coverage areas of different BTSs, a soft handoff is controlled by the BSC. When a subscriber unit moves between two sectors in the same coverage area, a softer handoff is implemented by the respective BTS.

A subscriber unit may be, for example, a mobile station or a fixed wireless access (FWA) station. The following specific embodiments refer mainly to mobile stations but, as the skilled person would readily appreciate, a number of aspects of the embodiments apply also to FWA.

Advantageously, the invention may be implemented using Code Division Multiple Access (CDMA) communications.

DETAILED DESCRIPTION OF THE SPECIFIC EMBODIMENTS

Specific embodiments and the best mode of the invention will now be described by way of example, with reference to the drawings, in which.

The following is a description of a prior art cell and various embodiments of the invention all of which prefer-ably may use CDMA communications. A background review of various relevant aspects of CDMA technology, including soft and softer handoffs, is given at the end of this specific description.

Figure 1:
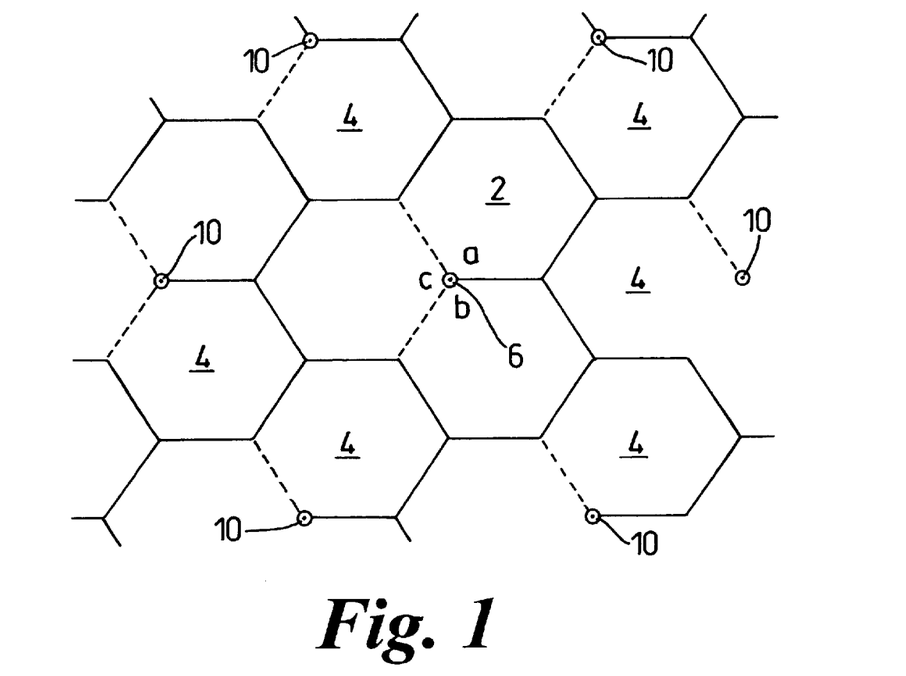
FIG. 1 is a schematic plan view of a portion of a conventional cellular communications network, including a three-sectored cell.

FIG. 1 shows a portion of a cellular communications network in which a conventional three-sector cell 2 is surrounded by neighbouring cells 4 in a network of cells. The cell comprises three 120° sectors a, b, c surrounding its centre, where a cell site is situated, for example at an antenna mast. The overall cell shape is formed of three approximately hexagonal lobes, each having a corner at the cell centre. Each sector approximately covers a respective one of the hexagonal lobes, termed corner-excited hexagons. The figure shows only the nominal beam footprints for the three sectors. At the cell site is situated a base transceiver station (BTS) 6 for handling communications with mobile stations in each sector. For example, in a known type of three-sector cell, termed a TC3S cell, a single Nortel IS-95 CDMA BTS is used, which can handle communications in up to three sectors, i.e. all sectors in the three-sector cell. This BTS is manufactured by Northern Telecom Limited, World Trade Center of Montreal, 380 St. Antoine Street West, 8th Floor, Montreal, Quebec H2Y 3Y4, Canada. Other cells in the network may contain similar BTSs or different BTSs.

Figure 2:
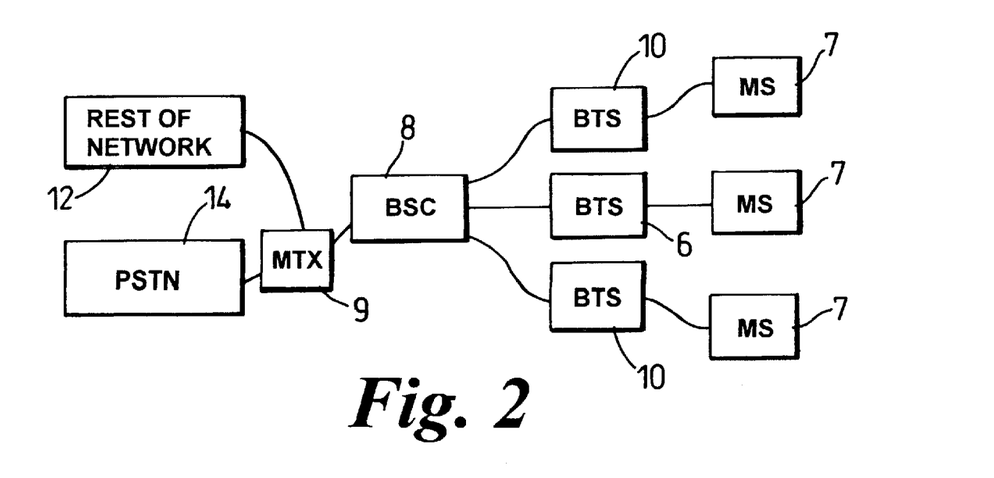
FIG. 2 is a block diagram of the cellular communications network of FIG. 1.

As shown in FIG. 2, the BTS 6 can communicate with a number of mobile stations 7 and is connected to a base station controller (BSC) 8, which may be some distance from the cell. The BSC is also connected to the BTSs 10 of nearby cells, and via a mobile telephone exchange (MTX) 9 to the remainder of the mobile network 12 and, typically, to the public switched telephone network (PSTN) 14.

The three-sector BTS 6 controls communication with mobile stations within all three sectors of its cell and as a mobile station moves from one sector to another it can control handoffs substantially without reference to the BSC (although the BSC is informed of each handoff). These are termed softer handoffs, and contrast with handoffs as mobile stations move from one cell to another. The latter can only be controlled by the BSC instructing the BTSs of both cells, and are termed soft handoffs.

Structure and Operation of a 9-Sector TC9S Cell

Figure 3:
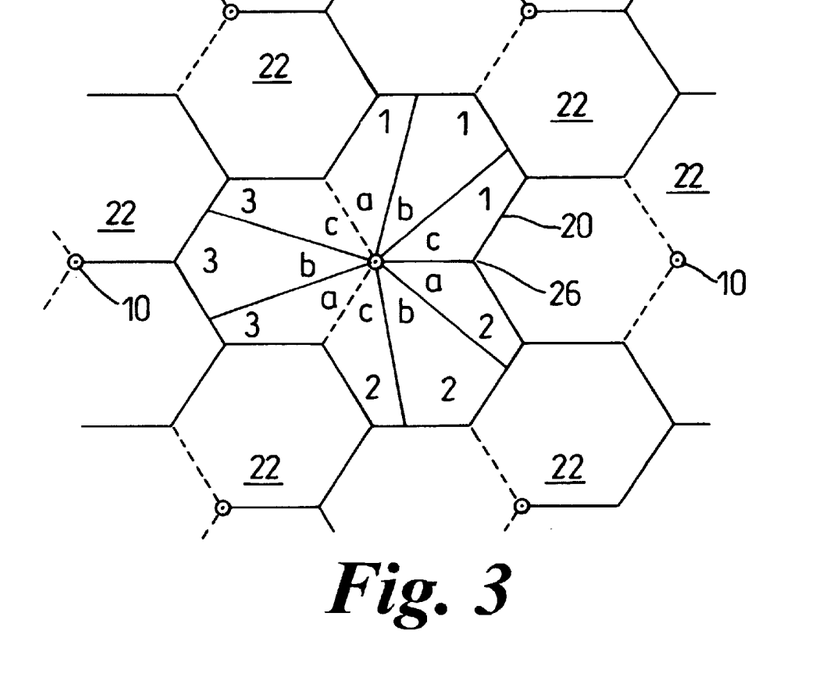
FIG. 3 is a schematic plan view of a portion of a cellular communications network, including a nine-sectored TC9S cell according to a first embodiment of the invention.

FIG. 3 shows a nine-sector cell 20 according to a first embodiment of the invention surrounded by neighbouring cells 22 in a cell network. This cell 20 is termed a TC9S cell and comprises nine sectors a1, b1, c1, a2, b2, c2, a3, b3, c3 of approximately 40° surrounding its centre. In FIG. 3, the nominal downlink (forward link) beam footprints for the sectors are shown.

The overall shape of the nine-sector cell 20 is similar to that of the three-sector cell 2 in FIG. 1. However, at the cell site 26 are three, three-sector BTSs 28, each controlling three adjacent sectors a, b, c covering one of the corner excited hexagonal lobes of the cell. Thus, conceptually, the pattern of the three 120° sectors of the BTS 6 in the three-sector cell in FIG. 1 has been compressed into each 120° area in the nine-sector cell. Each group of three sectors, in this case forming a larger, 120° sector, controlled by a single BTS will be referred to herein as a trisector.

Although the TC9S cell illustrated in FIG. 3 comprises three corner-excited hexagons, the invention is not limited to this cell shape, but may be applied to any suitable cell shape or geometry. For example, a TC9S cell may be a centre-excited hexagon.

Figure 4:
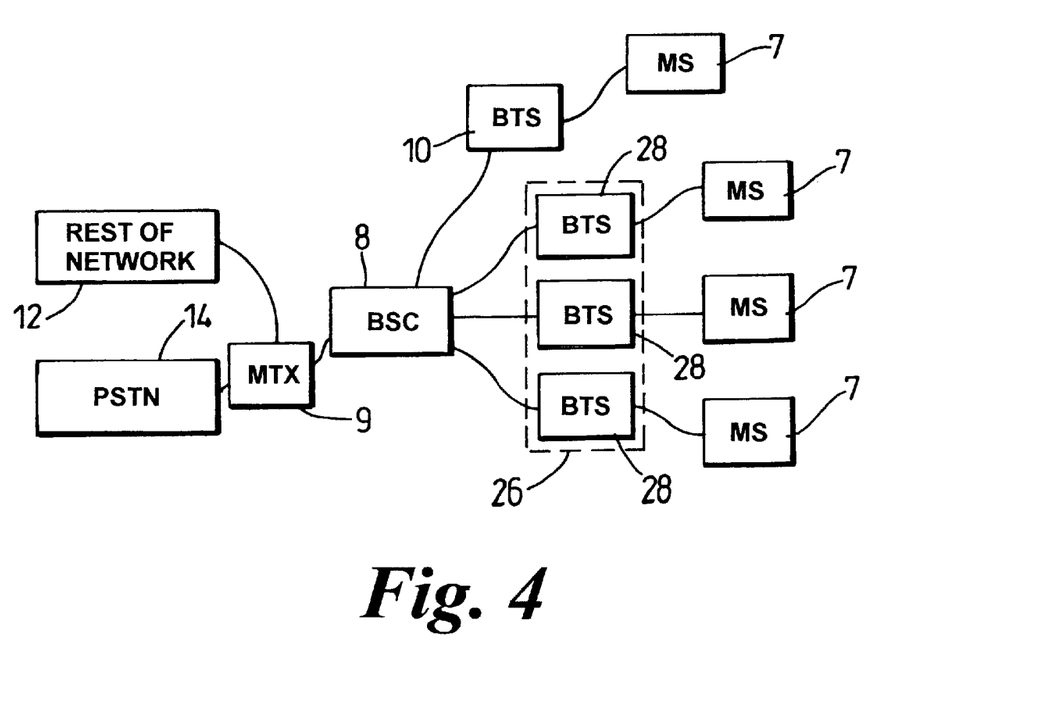
FIG. 4 is a block diagram of the cellular communications network of FIG. 3.

As shown in FIG. 4, each three-sector BTS 28 at a TC9S cell site 26 is connected independently to a BSC 8. The three co-located BTSs do not need to be connected to each other. This means that substantially the same type of BTS hardware and software may be used in a nine-sector cell as in a conventional three-sector cell, which significantly enhances the flexibility of the system. For example, not all of the cells in a network need to be the same. A nine-sector cell may be able to handle more calls from mobile stations but may be more expensive to install than a three-sector cell. Therefore, a network may comprise mostly three-sector cells, with nine-sector cells only in areas of high demand.

In addition, a three-sector cell may easily be upgraded to a nine-sector cell to increase capacity without acquiring any new sites for cell sites.

As well as the nine-sectored cell described above, a six-sectored cell may similarly be implemented using two IS-95 BTSs (or other three-sector BTSs). Each BTS then covers three 60° sectors, which form a larger, 180° trisector. In principle, a cell containing any multiple of three sectors, such as 12 or 15, may be implemented using IS-95 BTSs (or other three-sector BTSs) in this way.

Cell-Site Equipment in a TC9S Cell

Figure 5:
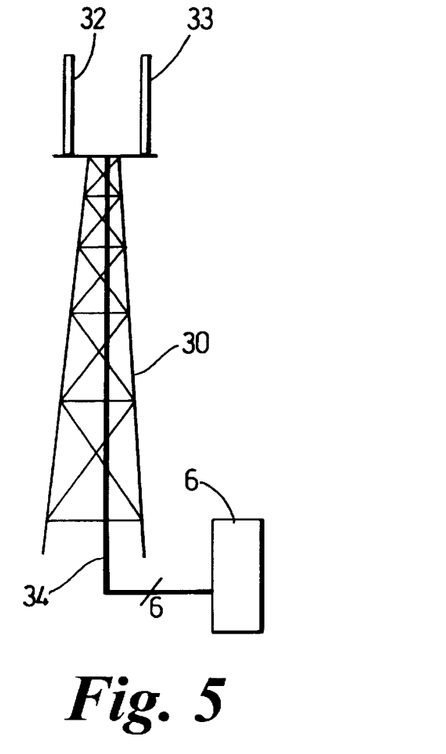
FIG. 5 is a schematic view of the cell-site equipment for a conventional three-sectored cell.
Figure 6:
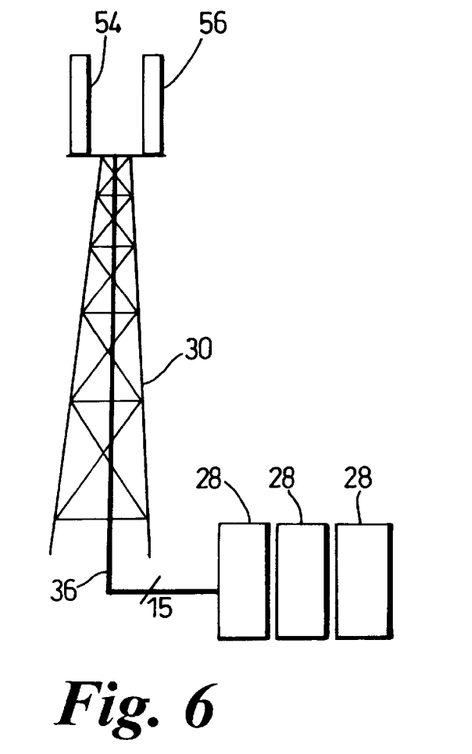
FIG. 6 is a schematic view of the cell-site equipment for a TC9S cell.

FIGS. 5 and 6 show, respectively, the hardware or cell site equipment required at a conventional TC3S cell site (as described with reference to FIGS. 1 and 2) and a TC9S cell site. FIG. 5 shows a single TC3S BTS 6 at the base of an antenna mast 30. Six conventional sectored antennas (only two are shown in FIG. 5) are located at the top of the mast in known manner. Two horizontally-spaced antennas cover each of the three sectors of the cell, being a main beam antenna 32 and a diversity beam antenna 33. The BTS is connected to each antenna via one of six coaxial cables 34. (Other numbers of cables may be required depending on how signal diplexing is handled between the BTS and antennas).

Figure 8:
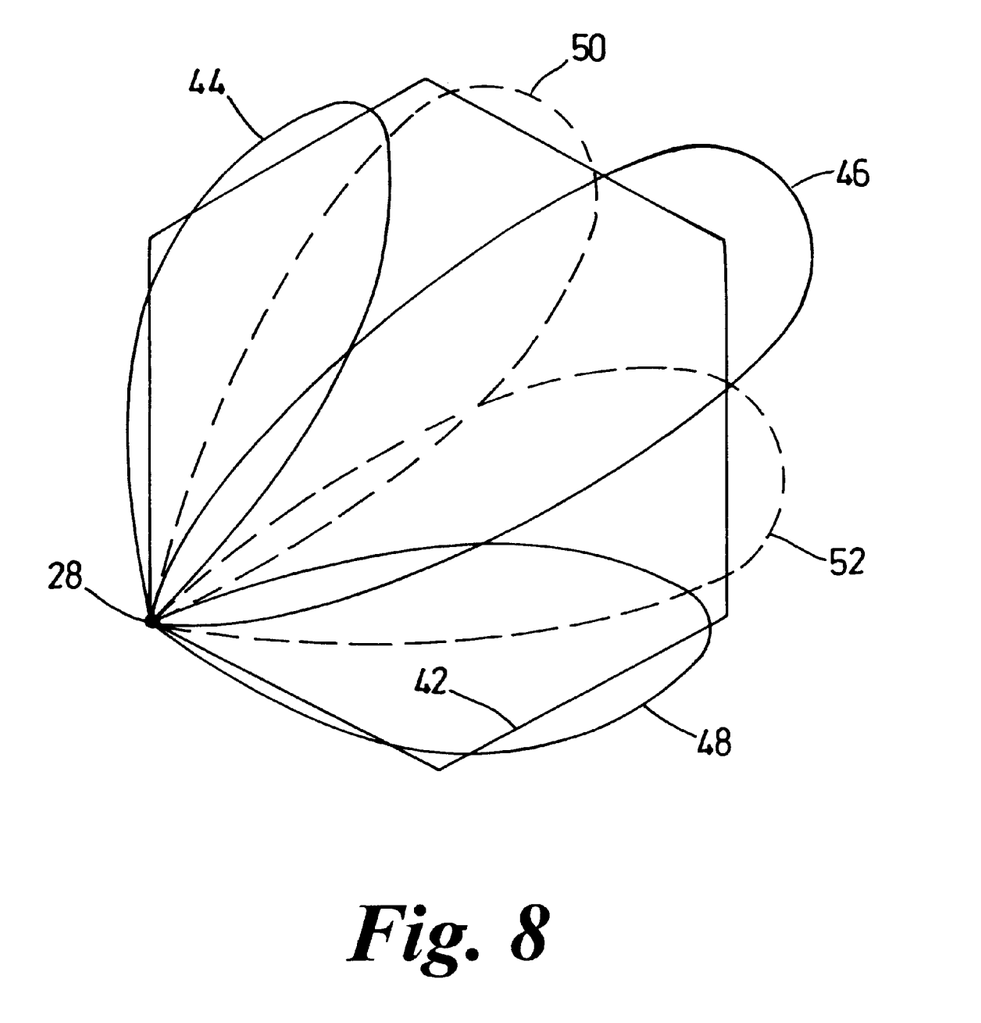
FIG. 8 is a schematic plan view of the footprints of the uplink and downlink beams of a 120° trisector of a TC9S cell.

FIG. 6 shows the corresponding cell site equipment at a TC9S cell site. Six phased-array antenna facets are located at the top of an antenna mast 30. As shown in figures, the antenna facets in the TC9S cell are broader than those in TC3S, to generate the narrower beam widths required. Each trisector of the cell is covered by a pair of horizontally-spaced antenna facets, a main-beam facet and a diversity-beam facet, (one such pair 54, 56 is shown in FIG. 6) coupled to one of three BTSs 28 at the foot of the mast. (Polarisation-diverse antennas rather than diversity-spaced antennas may be used). Each main-beam antenna facet is coupled to the corresponding BTS via three coaxial cables, enabling the BTS to drive the antenna facet so as to generate three main beams to cover the three sectors of the corresponding trisector. Each diversity-beam antenna facet is coupled to the corresponding BTS via two (or three) coaxial cables to generate two (or three) uplink diversity beams. For reasons discussed later, it is preferable to generate two diversity beams covering the cusp regions between the main beams. FIG. 8 illustrates schematically the coverage areas, or footprints, of the beams covering one 120° trisector 42 in this preferred embodiment of a TC9S cell. A total of fifteen coaxial cables 36 are then required to link the three BTSs to the six antenna facets.

Figure 7:
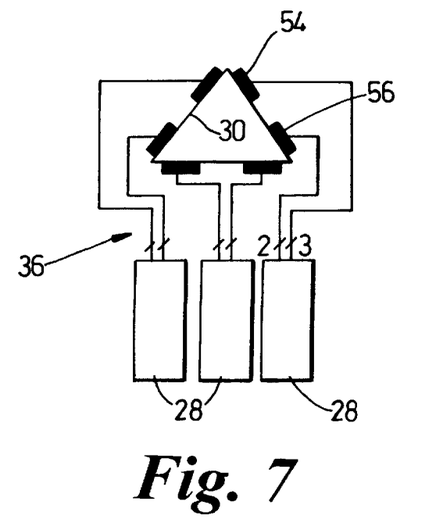
FIG. 7 is a schematic plan view of the cell-site equipment of FIG. 6.

FIG. 7 is a block diagram of the connections between the BTSs and the antenna facets in the TC9S cell site equipment of FIG. 6, using the reference numbers of FIG. 6. FIG. 7 also shows the antenna facets of FIG. 6 viewed from above, each pair of facets being arranged on a respective face of an equilateral triangle so as to cover respective trisectors of the cell. For example, facets 54 and 56 respectively provide main beam and diversity facets covering a trisector to the upper right of FIG. 7.

Antennas in a TC9S Cell

Each Nortel IS-95 BTS has three outputs and six inputs. On the downlink, each BTS 28 in a TC9S cell generates three main beams 44, 46, 48, each nominally covering a 40° sector of a trisector. The three main beams are also used on the uplink, using three of the six BTS inputs.

As a result of factors well-known to the skilled man, the footprints of the main beams 44, 46, 48 overlap to provide coverage throughout the trisector 42, and the intensity, or gain, of each beam varies throughout its footprint, particularly towards its edges.

The main beams may be generated by three separate antennas or antenna facets or in a preferred embodiment by one phased-array antenna facet 54 (as shown in FIGS. 6 and 7).

In one embodiment of a TC9S cell, three uplink diversity beams are also generated, having similar footprints to the main beams described above. The diversity beams may be generated by three antennas or preferably by one phased-array antenna facet 56 as shown in FIGS. 6 and 7. The diversity antenna is spaced from the main antenna, preferably by about 3 meters, to ensure uncorrelated uplink fading (spatial diversity) between the main and diversity beams.

In a preferred embodiment, an alternative diversity beam arrangement from that described above may be advantageous in order to improve uplink performance. The first reason for this is that at the beam crossover points between adjacent main beams there may be significant cusping (of the order of −4 dB down on peak beam gain). This will be mitigated to some degree (but probably not completely) by the incoherent combination process in the BTS rake receiver. The second reason may be a lack of diversity gain between the main beams. Unless the scattering in the environment is severe, the signals received on all of the main beams are likely to be highly correlated in their fading because all of the main beams are generated by a single aperture (leading to poor demodulator performance due to lack of diversity, and thus low capacity). (Diversity spacing or polarisation diversity means that the diversity beams will be uncorrelated with the main beams, even if scattering is not particularly severe).

To overcome these two problems, in the preferred embodiment, the second (diversity) antenna facet generates two beams 50, 52 as shown in FIG. 8, with this diversity facet sufficiently spaced (by about 3 m) from the main facet to ensure uncorrelated uplink fading. These two diversity-facet beams will provide two further inputs to the Nortel BTS for that sector (leaving one spare receiver input). The two beams are designed to have the correct gain to match the hexagonal sector footprint, and to fill in the cusps due to the beam crossovers of the main facet beams. Thus the diversity-facet-beam pointing direction will be around ±16° relative to boresight of the central main beam, and the peak beam gain some 1 dB less than the peak beam gain of the central main beam.

It will be observed that the total number of receiver channels per tricell for the above two facets is five, leaving one spare input to the Nortel BTS. It is proposed that this spare input could be used for a separate downward-tilting antenna integrated into one of the facets. This downward-tilting antenna could provide full 120° trisector coverage, but only for close-in mobiles.

In either embodiment described above, the main antenna facet and the diversity antenna facet are preferably constructed as similar phased arrays for ease of manufacture. Further preferably, the main and diversity antennas may comprise a single manufacturable unit for ease of installation in the field.

As an alternative, polarisation diversity could be used instead of the spatial diversity arrangement described above.

Antenna Configuration for TC9S—Main Facet

The principal aim in designing a TC9S antenna facet is to produce a set of beams to cover each trisector on the downlink. In the embodiment of FIG. 3, this means corner-exciting a hexagon, so that the beams need to have the correct gains in the various directions to match the desired hexagonal footprint as closely as possible. The exact gain figures depend on the particular pathloss law, but for an assumed pathloss law of 35 dB/decade this leads (by simple geometrical considerations) to a gain (relative to gain in the 0° boresight direction) of −2.2 dB at ±30° and −10.5 dB at ±60°. (If a 40 dB/decade pathloss law is assumed, the gain is −2.5 dB at the +/−30° points and −12.0 dB at the +/−60° points). For minimal equipment cost and minimal wind loading it would be advantageous to generate the full set of three downlink beams from a single facet.

In a preferred embodiment of a main-beam antenna facet, four antenna elements with a 180° element pattern are placed at half-wavelength spacing, which should allow the facet to have a width of less than 40 cm at 1900 MHz. Advantageously, the individual elements can be given some directivity by narrowing their elevation pattern. A fixed (orthogonal) phasing network is used to generate orthogonal beams (whereby the peak of one beam corresponds to the nulls of its neighbours) in the wanted directions of 0° and ±30°. For example, a Butler Matrix may be used, with the addition of up-front phase shifters to rotate the central beam into the boresight direction and to rotate its neighbours into their respective directions at +/−30°. In order to reduce the sidelobe level (the reasons for doing this are explained below) a −3 dB 'amplitude tapering' is preferably applied to the outer two elements (with the side-effect of slightly broadening the main beams). In the preferred embodiment, the 3 dB beamwidths are about 29° (main beam) and 34° (side beams), and in both cases the first sidelobes are around 16 dB down on beam peak gain. In order to better match the beam gains to the cell footprint we 'pad down' the transmitted power on the ±30° beams by some 2.2 dB. The beam gains in the ±60° directions are then some 9.5 dB down on boresight, which matches quite closely the desired hexagonal footprint.

Figure 9:
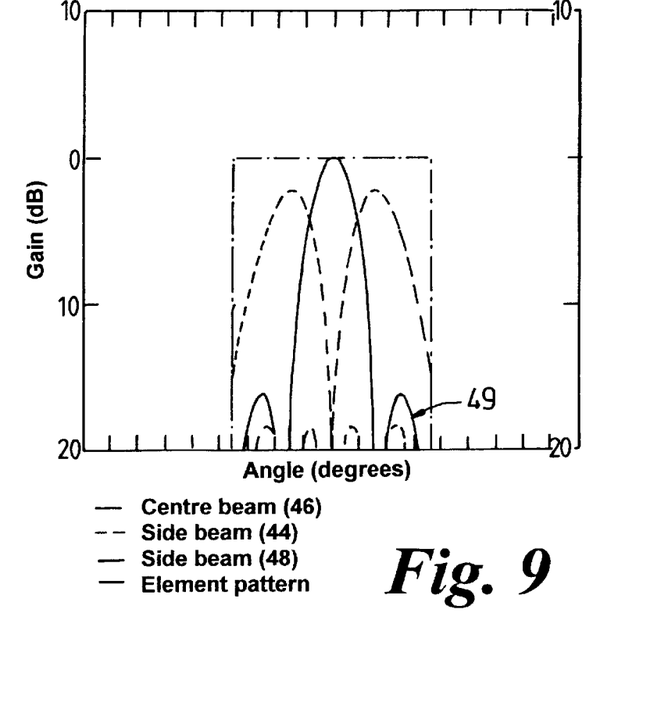
FIG. 9 is a plot of beam gain versus azimuth angle for three main beams covering a 120° trisector of a TC9S cell.
Figure 10:
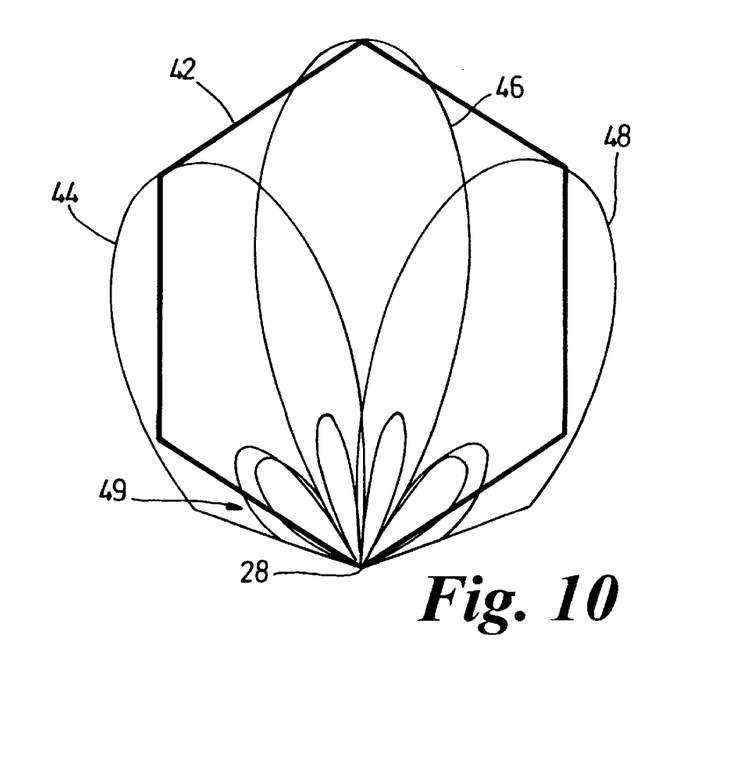
FIG. 10 is a plan view of the footprints of the main beams of FIG. 9.

FIGS. 9 and 10 have been produced by modelling (using MathCAD) the performance of this preferred antenna facet and show a plot of beam gain versus angle of the three beams generated by the facet (relative to boresight of the central beam) and a plan view of the footprints of the three main beams 44, 46, 48 covering a trisector. Each figure also illustrates the sidelobes 49 of the three beams. It has been found that it is desirable to reduce sidelobe levels, and that reducing sidelobe gain by a few dB by applying the amplitude taper across the antenna facet elements as described above significantly increases communications capacity, although it slightly broadens the footprint of each main beam.

Antenna Configuration for TC9S—Diversity Facet

The diversity facet is preferably of the same configuration as the main facet, particularly in the embodiment in which the main and diversity beam patterns are the same. Even in the preferred embodiment employing only two diversity beams, the antenna configuration is advantageously similar to that of the main facet for ease of manufacture, although it will be driven differently to produce two diversity beams as would be appreciated by the skilled person.

TC9S Power Amplifier Requirements

CDMA power amplifiers (PAs) in particular are expensive, since they need to be extremely linear to cope with the large fluctuations in the CDMA downlink signal envelope power. This is even more so for a multi-carrier power amplifier used for a multi-bearer downlink. Advantageously, however, downlink PA power may not be a problem for the TC9S system (in either a single-bearer or multi-bearer deployment) due to the benefits of beam gain offered by the narrow downlink beams. In fact, upgrading a conventional single-bearer or multi-bearer cell to a TC9S cell allows downlink coverage to be maintained with reduced PA power.

Consider a single-bearer Nortel TC3S BTS, which when deployed in a conventional (fully-loaded, non-range-extended) configuration (as in FIG. 1) has a PA power of P, a downlink capacity of C and a sector area of A. If we were to replace this BTS with a single-bearer TC9S configuration using three similar BTSs (as in FIG. 3), yet still maintain the cell footprint (i.e. maintain the same peak estimated isotropic radiated power (EIRP)) then each TC9S BTS would require a PA power of P−3.5 dB (due to an assumed 3.5 dB beam gain), have an expected capacity in the range 1.5C–2.5C, and still maintain the tricell footprint area A.

Now consider an alternative upgrading strategy to the one in the previous paragraph, whereby instead of deploying a single-bearer TC3S BTS with area A (as described with reference to FIG. 1) we deploy a lightly-loaded 3-bearer TC3S BTS with area 1.3A (due to range extension benefit on the uplink) and sector capacity 1.3C (same user density, spread now over 3 bearers). This may be a first (partial loading) step in the upgrading strategy. Now we take the second step, which is to replace the multi-bearer TC3S BTS with a multi-bearer TC9S BTS, and load it up to maximum downlink capacity (on all bearers). We are now in a very similar scenario to that of the previous paragraph, except that now we have 3 bearers, and on average an extra 2 dB in base-mobile pathloss (since the average cell area increase is 1.3, so that the average range increase is 1.14, and the assumed mean pathloss law is 35 dB/decade). Three bearers in an MCPA implies 4.8 dB extra power requirement compared with the single-bearer case, so the total PA power now required (on the main beam) is P−3.5 dB+4.8 dB+2 dB=P+3.3 dB. Thus as long as we have an MCPA capable of supplying P+3.3 dB mean power for our 3-bearer TC9S, then the PAs are sufficiently powerful. Since it is reasonable to assume that an MCPA of at least P+4.8 would already be specified for the 3-bearer BTS MCPA (for conventional 3-bearer fully-loaded deployment), then we can say that downlink PA requirement is not a problem for TC9S (in either the 1-bearer or multi-bearer deployment), and in principle TC9S would allow us to use slightly lower-output PAs than would otherwise be necessary. Advantageously, this means that when a cell is upgraded according to the invention, for example from three sectors to six or nine sectors, similar BTS hardware can be used without requiring additional PA capacity.

Handoff in a TC9S Cell

In the preferred embodiment described above, a TC9S cell comprises three co-located IS-95 BTSs at its centre, each handling a trisector composed of three 40° sectors. Therefore, if a mobile station moves within the cell from one sector to another, a softer handoff is required if both sectors are handled by the same BTS and a soft handoff is required if the sectors are in different trisectors and so handled by different BTSs.

A Nortel IS-95 BTS which has allocated a forward (downlink) channel on any of its three 40° sectors will search for mobile station uplink signals on all of its antenna inputs, which cover the full 120° trisector covered by the BTS. This means that if a BTS has a downlink to a mobile station in any sector, the uplink (but not the downlink) is effectively always in softer handoff to all three sectors.

In the case of the downlink this means that as a mobile station moves across a trisector from one beam to another, a softer handoff occurs. Thus, the mobile in the handoff region between two beams is allocated a traffic channel on each beam. Both of these traffic channels are generated within the same cell-site modem (CSM) device. In the uplink direction the BTS CSM rake will carry out a noncoherent combining of the received signals from both sectors (before data detection). (This is for IS-95. Future systems such as 3G may allow coherent combining). However, as the mobile station moves from one trisector to adjacent trisector, the situation is somewhat different. The mobile station is now moving from one BTS to another (albeit colocated) BTS. Thus it is now involved in a soft handoff. In the downlink direction this requires allocation of a downlink channel on each BTS (controlled within the SBS software of the BSC), and in the uplink direction the received frames are separately decoded by each BTS before a (frame) selection diversity procedure is carried out at the BSC (based on signal quality indicators) in known manner.

The handoff procedures described above advantageously result substantially automatically from the colocation of three substantially conventional three-sector BTSs at one cell site according to the TC9S configuration described herein. This arrangement therefore offers a method for upgrading a conventional cell-site to TC9S at minimum cost. However, the performance of a TC9S cell site may be improved by modifying the colocated BTSs in certain ways, as described below.

Modifications of TC9S

One consideration in a TC9S cell is to ensure that close-in mobiles are properly power-controlled on the uplink. Otherwise, the cell may suffer from what is commonly referred to as the 'near far' effect, whereby excessive received power at the BTS due to close-in mobiles transmitting too much power swamps the received signals from more distant mobiles. This may happen for two reasons. The first is that the pathloss to the close-in mobiles is much lower (due to reduced range and possible line-of-sight propagation). The second is that these mobiles are situated at a very low elevation angle, and so could be wandering in and out of the elevation sidelobes (and perhaps even backlobes) of the antennas. If such a mobile quickly moves from an antenna null to an antenna peak (even a sidelobe or backlobe peak), then it needs to be quickly power-controlled to avoid swamping all the other signals on that antenna. This situation is taken care of in the conventional TC3S three-sector system configuration by the fact that all antenna inputs are being continuously monitored by a single CSM rake device, utilising a fast searcher finger, continuously searching for new powerful signal arrivals. If a signal path suddenly appears and threatens to swamp one antenna input it is detected by the searcher, combined-in by a demodulation finger, and the mobile transmitter is promptly power-controlled down to the correct level. In the TC9S system, however, one CSM rake device can only search for mobile signals within its own trisector. If a close-in mobile approaches a trisector from behind, it could move into a backlobe of the antenna and swamp the wanted signals before the network has time to pick it up, force it into handoff and then power-control it. In a preferred embodiment, this problem is addressed by using some intelligence at the BTS to detect which mobiles are close-in (based on chip-time offset or power-control level, for example) and lock these mobiles into soft handoff with all of the colocated BTSs at the cell site. This ensures that any of the BTSs can rapidly control the power of these mobile stations and avoid near-far problems.

TC9S Uplink Considerations

In the description above, one preferred embodiment is the 'extended range' implementation of a TC9S cell, where a TC9S cell with an area of, for example 1.3A, is used to service an enlarged cell area, where a conventional cell would have served an area A. It is then necessary to ensure that the TC9S uplink is within its link budget for even the most distant mobiles. The extended-range implementation is the most taxing on the uplink, so if this scenario is acceptable, a standard-range TC9S cell (of area A) would also be expected to provide acceptable uplink performance. Where the cell area is 1.3 times the conventional fully-loaded cell area, this implies an extra 2 dB mean pathloss for a 35 dB/decade law.

This issue can be considered by taking as a reference a fully-loaded cell (area A) with capacity C, and which is downlink capacity limited (such that the uplink is running at 50% of capacity, and thus has 3 dB IDM (Interference Degradation Margin)). We assume that our range-extended TC9S cell has a best case capacity of 2.0 C (again, constrained by the downlink). However, in the uplink we make a pessimistic assumption that our TC9S cell has 1 dB higher mean demodulator Eb/No implying a pole capacity reduced to 80% of what it would otherwise be. We assume a beam gain of 3.5 db and a spatial filtering factor of 70/30=2.3 (this is a rather crude figure calculated simply from the ratio of 3 dB beamwidths of the conventional and TC9S systems). What then is the proportion of pole capacity in the TC9S uplink?. Based on the previous assumptions it will be 0.5*(1/0.8)*(1/2.3)*(2.0)=0.54, so IDM will be 3.4 dB. Thus we have an increase in IDM of 0.4 dB, an extra 3.5 dB of beam gain, but an extra 2 dB of mean pathloss (due to the larger cell area). Thus it can readily be seen that the range-extended TC9S uplink can meet its coverage obligations with about 1.1 dB of margin in hand.

Thus if a TC9S cell is placed among a sea of conventional cells, in a preferred embodiment approximately 1.1 dB of noise injection would be required in the TC9S uplink receiver chain in order to constrain the uplink handoff boundaries.

Interaction Between TC9S Cells and Other Cells

Most of the description above has assumed that if a TC9S cell is implemented to replace (upgrade) a conventional cell, the TC9S cell shares a common (approximately hexagonal) footprint with the conventional cell which it replaces. This means that the inter-cell handoff regions remain approximately unchanged (although there will be increased soft handoffs between beams in each trisector), and the antenna radiation patterns of surrounding non-upgraded cells may remain unchanged. The TC9S uplink beams will have higher gain than those of the conventional cell replaced by the TC9S cell and so it may be advantageous to inject a small amount of noise into the TC9S uplink signals to constrain the uplink handoff boundary of the TC9S cell to match the boundaries of the surrounding cells. The surrounding cells are also likely to be affected on the uplink by interference from mobile stations in the TC9S cell. The reason for upgrading a cell to a TC9S cell within a network is usually to accommodate a high mobile station user density. Therefore, the upgraded TC9S would be expected to contain a large number of mobile stations whose transmissions may cause uplink interference in surrounding cells.

Because narrower beams offer extra beam gain, the TC9S cell power amplifiers (PAs) must be reduced in output power in order to keep the desired footprint. In a preferred embodiment, however, the TC9S cell is operated at increased EIRP, so that its handoff boundaries are pushed out into the neighbouring conventional cells. This spreads out the increased capacity over the neighbouring cells. The disadvantage of this maybe that the cells no longer have a convenient hexagonal tessellation, and may require the beam shapes of the surrounding conventional cells to be changed also in order to optimise performance and avoid coverage 'black spots'.

In a further preferred embodiment the TC9S cells are tessellated in clusters of three cells (i.e. one TC9S cell and two conventional cells in every three-cell cluster). If we assume that the TC9S cell has a capacity gain of 1.6 times the capacity of a conventional cell and that this extra capacity is maintained as the TC9S cell handoff boundary is pushed out (by appropriate optimisation of the antenna patterns of the conventional cells), and that we can push out the TC9S cell boundary by a (linear) factor of 1.16 (needing an extra 2.3 dB in the uplink and downlink budgets, assuming a 35 dB/decade pathloss law), giving an area increase of 1.35, then since the extra capacity is 1.6 times we have an increased user density of 1.6/1.35=1.18 in the TC9S cell. Each conventional cell has a new mean area of (3−1.35)/2−0.825, and if there is no change in their capacity each can support an increased user density of 1/0.825=1.21 times.

Thus it can be seen that by exploiting some slack in the link budgets (due to the extra beam gain), and assuming we can tessellate our cells without losing the benefits of TC9S, we are able to support a 1.2 times increased capacity at every cell site by making or upgrading every third cell in a conventional network to a TC9S cell.

Further Embodiments

The description of specific embodiments herein has focused on the nine-sector TC9S cell and its relationship to the conventional three-sector TC3S cell and BTS. However, as the skilled person would readily appreciate, the invention is not limited to these embodiments. For example two, or four, three-sector BTSs may be colocated at a cell site to produce six- or twelve- sectored cells in similar fashion. It is expected however that performance gains may ultimately diminish if sectorisation increases too far, as the required number of handoffs increases, and angular spread in each beam (channel) will increase "effective" beam widths.

Similarly, the invention may be applied to upgrade omni-directional cell sites into sectored cells by colocating several one-sector BTSs at the cell site and providing suitable antenna facets. Or two or more two-sector BTSs may be colocated at one cell site with suitable antenna facets.

The invention may also find application in fixed wireless access (FWA) schemes, where a BTS at a cell site communicates with geographically-fixed subscriber units. In such a scheme, higher sectorisation may be possible than with mobile subscriber units because handoffs would seldom occur. For example, in a FWA system if subscriber units have directional antennas then no cellsite-cellsite handoffs occur.

A further advantage of the invention in FWA, for subscriber units having directional or omni-directional antennas, may be that the channel angle-scatter would be expected to be much reduced, so narrow effective beamwidths may be maintained.

Background Technology—Code Division Multiple Access

CDMA is a modulation and multiple access scheme based on spread-spectrum communication, a well-established technology that has been applied recently to digital cellular radio communications. Multiple access allows simultaneous communications on many channels between a BTS and a number of mobile stations. In CDMA, these channels are carried in the same, relatively broad, band of frequencies. The bandwidth is typically 1.25 MHZ in IS-95. The signal (assumed to be vocoded, coded, interleaved etc) in each CDMA channel is spread with a different pseudo-random (PN) binary sequence before being used to modulate an RF carrier. A large number of CDMA signals can share the same frequency band. The signals are separated in a receiver using a correlator, which isolates a particular channel by accepting only signal energy from the selected PN sequence assigned to that channel and despreads its spectrum. Signals on other channels, whose PN sequences do not match, are not despread and, as a result, contribute only weakly to the noise and represent a self-interference generated by the system.

Further background information about CDMA is given in "New Concepts in Multi-user Communications": Proceedings from The Advanced Study Institute Conference on Concepts in Multi-user Communication, Ed. J. K. Skwirzynski. NATO, UK, Aug. 4–16, 1980, which is incorporated herein by reference.

The use of CDMA in mobile communications is specified by Telecommunications Industry Association/Electronics Industry Association (TIA/EIA) standards and draft standards, which are incorporated herein by reference including TIA/EIA/IS-95-A, Mobile Station-Base Station Compatibility Standard for Dual-Mode Wideband Spread Spectrum Cellular System, May, 1995, Specification, January 1992.

Conventional Mobile—Station—Assisted Soft Handoff

A handoff mechanism allows a telephone call to continue when a mobile station crosses the boundary between two cells or sectors.

A soft handoff in a CDMA system occurs when a mobile station moves from an area served by a first BTS to an area covered by a second BTS. This can be a movement from one cell to another or between sectors covered by different BTSs in the same cell. Each BTS broadcasts a pilot signal in each sector which it covers. The strength of each pilot signal determines the area of coverage of each sector in known manner.

At call initiation, a mobile station is provided with a list of BTSs or cell sectors which are most likely candidates for a handoff during the call, a set of handoff signal-strength thresholds (including an add threshold and a drop threshold), a strength margin and a time margin.

A CDMA mobile station typically has a rake receiver with three receiver fingers and a searcher (though some types may have more). In the typical case the mobile station may assign one finger to track the signal from the BTS which set up the call and two fingers to track the strongest other two BTS signals from the list, while the searcher scans for other useful signals. The searcher finger may not only monitor the strengths of pilot signals from other BTSs on the list but may also find other pilot signals from other, new BTSs, in which case it may cause the mobile station to modify its list of candidates for soft handoff. The list is transmitted to the BSC whenever it is requested, whenever the list changes by having a new pilot appear on the list, or whenever an existing pilot falls below a level that is useful to support the communications traffic.

When a mobile station communicating via a first BTS moves away from the area of coverage of the first BTS towards that of a second, the pilot signal strength from the second BTS typically increases until it exceeds the add threshold. At this time, the mobile station sends a control message via the first BTS to the BSC. The BSC responds by commanding the mobile station to commence communicating with the second BTS as well as the first, and commanding the second BTS to commence transmitting and receiving the telephone call data to and from the mobile station. The mobile station then uses diversity combining of the two signals to enhance the overall received signal. Power control information is received from both BTSs; both BTSs have to request a power increase for the mobile station to increase its power. (Uplink-open-loop power control, uplink-closed-loop power control, and downlink power control are employed in known manner). Data from the mobile station are received by both BTSs and are forwarded to the BSC where the better (BTS) source is selected on a frame-by-frame basis. (Diversity combining is not generally used at the BSC, although in principle it could be used).

It will be appreciated that a BTS manages handoffs differently from a mobile station. Each BTS therefore continues to broadcast only its pilot signal (and sync, paging and other traffic channels) unless the BSC tells it that the mobile station has received the pilot signal sufficiently strongly (above the add threshold) to request that a communications link be set up with that BTS. Under the control of the BSC, the BTS then forms one of the two or more links on which communications are carried during the soft handoff.

During this state of two(or more)-way linkage, the mobile station is said to be in soft handoff.

The two-way linkage described above can be terminated in several ways depending on the movement of the mobile station. It can be terminated by returning to the first BTS only, or by dropping the first BTS in favour of the second, or by initiating tracking another BTS prior to completion of the handoff. In each case a communications link is dropped if the signal strength received at the mobile station on that link falls below the drop threshold for longer than the time margin.

Signal strength in CDMA is in practice evaluated in terms of the parameter $E_c/I_o$, which is the ratio of energy per chip to the noise power spectral density in a received CDMA signal.

Conventional Softer Handoff

As is known from the prior art, a softer handoff is the mechanism for handling the link between a mobile station and a BTS when the mobile station moves between two sectors of a cell covered by the same BTS, as in a TC3S cell. In a softer handoff, the mobile station functions exactly as in a soft handoff, as described above, but the BTS functions differently. As for a soft handoff, if a mobile station detects a pilot signal rising above the add threshold it sends a command message to initiate a handoff. The mobile station cannot know whether this will be a soft or softer handoff.

In a soft handoff, the BTS receiving the command message passes it to the BSC which controls the handoff procedure. But if the BTS receives a command message requesting initiation of a handoff between two of its own sectors, it intercepts the command message and can directly initiate transmission and reception in the new sector. The BTS thus provides a parallel, two-way (or more) linkage during softer handoff as is provided by two or more BTSs during soft handoff. The BTS uses a diversity combiner to combine signals received from the mobile station in each sector, thus increasing diversity until the softer handoff is completed, for example by termination of either the link in the original sector or the link in the new sector, depending on the movement of the mobile station.

During softer handoff, the BSC is notified of the procedure and provides information to the BTS to enable the handoff but does not participate directly in the way that it does during a soft handoff.

What is claimed is:

1. Cell-site equipment for location at a cell-site of a cell in a code division multiple access (CDMA) cellular radio communications system, said cell having more than one sector, comprising:

one or more antennas for generating a plurality of radio communications main beams, a respective one of said main beams covering each one of said sectors; and a plurality of base transceiver stations (BTS), each BTS being independently coupled to a base station controller (BSC) and coupled to one or more of said antennas for handling communications in a respective coverage area comprising one or more of said sectors, at least one of said BTSs handling communications in a coverage area comprising two mutually-adjacent sectors, such that a subscriber unit located in a sector in a coverage area of a BTS communicates with said BTS using said respective main beam covering said sector;

said cell-site equipment operating such that, if a subscriber unit moves from a first of said sectors to a second of said sectors, said first of said sectors being in said coverage area of a first of said BTSs and said second of said sectors being in said coverage area of a second of said BTSs, then radio communication between said subscriber unit and said second of said BTSs is set up by means of a soft handoff, said soft handoff being controlled bv said BSC;

and said cell-site equipment operating such that, if a subscriber unit moves from a first of said sectors to a second of said sectors, said first of said sectors and said second of said sectors being in said coverage area of the same one of said BTSs, then radio communication in said second sector between said subscriber unit and said one of said BTSs is set up by means of a softer handoff, said softer handoff being controlled by said one of said BTSs.

2. Cell-site equipment according to claim 1, in which said plurality of BTSs is a plurality of substantially identical BTSs.

3. Cell-site equipment according to claim 1, in which said coverage area of one of said BTSs comprises more than one sector, and said one or more antennas to which said one of said BTSs is coupled comprises a phased-array antenna which generates a plurality of main beams, a respective one of said main beams covering each of said sectors.

4. Cell-site equipment according to claim 3, in which said phased-array antenna comprises a row of spaced antenna elements or columns of antenna elements, and amplitude tapering is applied to one or more elements or columns of elements at each end of said row, or is applied across the row so that the amplitude-tapering decreases towards the centre of the row.

5. Cell-site equipment according to claim 1, comprising one or more antennas coupled to each BTS for generating one or more beams to cover said respective coverage area, in which said one or more antennas coupled to one of said BTSs includes a main beam antenna and a diversity beam antenna.

6. Cell-site equipment according to claim 5, in which said coverage area of one of said BTSs comprises three sectors, said main-beam antenna generates three main beams, one covering each sector, and said diversity-beam antenna generates two diversity beams covering the cusp regions between said main beams.

7. Cell-site equipment according to claim 1, comprising a means for identifying a subscriber unit communicating from a position close to a cell-site at which said cell-site equipment is located, and enabling adequate control of the power of transmissions from said subscriber unit to prevent swamping of communications with other subscriber units.

8. A cell site of a cellular radio communications system comprising cell-site equipment as defined in claim 1.

9. A base station controller for use in cell-site equipment as defined in claim 1.

10. An antenna for use in cell-site equipment as defined in claim 1.

11. A method for operating a cell of a code division multiple access (CDMA) cellular radio communications system, said cell having a cell site at which a plurality of base transceiver stations (BTSs) is located, each BTS being independently coupled to a base station controller (BSC), and each BTS being coupled to one or more antennas for generating one or more radio communications main beams, said cell being divided into a plurality of sectors such that a respective one of said main beams carries communications to and from subscriber units located in each one of said sectors, and each of said BTSs handles such communications in a coverage area comprising one or more of said sectors, said method comprising:

handling communications with subscriber units in each of said coverage areas using a respective one of said BTSs;

when a subscriber unit moves between a first of said sectors and a second of said sectors within different ones of said coverage areas, handling a transfer of communications from said first of said sectors to said second of said sectors by means of a soft handoff, under the control of said BSC; and when a subscriber unit moves between a first of said sectors and a second of said sectors, both of said sectors being within said coverage area of one of said BTSs, handling a transfer of communications between said first of said sectors and said second of said sectors by means of a softer handoff, under the control of said one of said BTSs.

12. A method according to claim 11, comprising the step of identifying a subscriber unit communicating from a position near said cell site and controlling the power of communications from said subscriber unit to avoid swamping of communications with other subscriber units.

13. A method for upgrading a cell of a code division multiple access (CDMA) cellular radio communications system having a cell site at which one or more BTSs are located, each said BTS being coupled to a base station controller (BSC), by increasing the number of BTSs at said cell site and increasing the sectorisation of said cell, communications with subscriber units in each sector being carried by a respective radio communications main beam generated by an antenna at said cell site, and each BTS handling communications in a coverage area comprising one or more respective sectors of said cell, a transfer of communications between sectors when a subscriber unit moves between two sectors in said coverage areas of two different BTSs being handled by means of a soft handoff, under the control of said BSC, and a transfer of communications between sectors when a subscriber unit moves between two sectors in said coverage area of the same BTS being handled by means of a softer handoff, under the control of said BTS.

14. A method according to claim 13, in which said cell is of a predetermined area before upgrading and the area of said cell after upgrading is greater than the area of said cell before upgrading.

15. A method according to claim 13, in which each BTS at said cell site after upgrading is independently coupled to a base station controller (BSC), and in which a soft handoff is implemented substantially under the control of the BSC, and a softer handoff is implemented substantially under the control of the BTS handling communications in the first and second sectors.

* * * * *

UNITED STATES PATENT AND TRADEMARK OFFICE
CERTIFICATE OF CORRECTION

PATENT NO. : 6,167,036
DATED : December 26, 2000
INVENTOR(S) : Beven

It is certified that error appears in the above-identified patent and that said Letters Patent is hereby corrected as shown below:

<u>Title page,</u>
Item [19] and [75], "Beven" should read -- Bevan --.

Signed and Sealed this

Sixteenth Day of July, 2002

Attest:

Attesting Officer

JAMES E. ROGAN
*Director of the United States Patent and Trademark Office*